United States Patent
Coogan et al.

(10) Patent No.: US 9,568,120 B2
(45) Date of Patent: Feb. 14, 2017

(54) FLUSH JOINT PIPE

(71) Applicants: John M. Coogan, Lansdale, PA (US); John R. Stott, Doylestown, PA (US); Steve B. Gross, Holland, PA (US); Gary A. Leigh, Kennett Square, PA (US); Joshua Clapper, Downingtown, PA (US)

(72) Inventors: John M. Coogan, Lansdale, PA (US); John R. Stott, Doylestown, PA (US); Steve B. Gross, Holland, PA (US); Gary A. Leigh, Kennett Square, PA (US); Joshua Clapper, Downingtown, PA (US)

(73) Assignee: NORTH AMERICAN SPECIALTY PRODUCTS LLC, Houston, TX (US)

( * ) Notice: Subject to any disclaimer, the term of this patent is extended or adjusted under 35 U.S.C. 154(b) by 138 days.

(21) Appl. No.: 14/015,235

(22) Filed: Aug. 30, 2013

(65) Prior Publication Data
US 2014/0183861 A1 Jul. 3, 2014

Related U.S. Application Data

(60) Provisional application No. 61/748,021, filed on Dec. 31, 2012.

(51) Int. Cl.
*F16L 1/036* (2006.01)
*F16L 1/10* (2006.01)
(Continued)

(52) U.S. Cl.
CPC ............... *F16L 1/10* (2013.01); *F16L 1/036* (2013.01); *F16L 1/09* (2013.01); *F16L 17/06* (2013.01); *F16L 37/148* (2013.01)

(58) Field of Classification Search
CPC ........ F16L 37/148; F16L 37/14; F16L 37/142; F16L 37/144
(Continued)

(56) References Cited

U.S. PATENT DOCUMENTS 738,503 A 9/1903 Waters
1,474,375 A 11/1923 Moore
(Continued)

FOREIGN PATENT DOCUMENTS

EP 0353180 A2 1/1990
EP 1030029 A1 8/2000
(Continued)

OTHER PUBLICATIONS

International Search Report & Written Opinion dated Nov. 26, 2013, with regards to International Application PCT/US2013/057504.
(Continued)

*Primary Examiner* — David E Bochna
(74) *Attorney, Agent, or Firm* — Michael E. Noe; Munck Wilson Mandala LLP

(57) ABSTRACT

A pipe has a tubular body with a male end and a female end. The male end has an external surface with a first engagement groove. The female end has an internal surface with a second engagement groove, and an aperture extending from an outer surface of the tubular body to the second engagement groove. The female end receives the male end of another pipe such that the first engagement groove of the male end axially aligns with the second engagement groove of the female end to establish a spline engagement groove having a groove length, $L_G$. A flexible spline is located in the spline engagement groove to lock the pipes together and establish a pipe assembly. The flexible spline has a spline length, $L_S$, and $L_S \leq L_G$.

24 Claims, 6 Drawing Sheets

(51) Int. Cl.
*F16L 17/06* (2006.01)
*F16L 37/14* (2006.01)
*F16L 1/09* (2006.01)

(58) Field of Classification Search
USPC ........................................................ 285/305
See application file for complete search history.

(56) References Cited

U.S. PATENT DOCUMENTS

| | | | |
|---|---|---|---|
| 1,562,372 A | 11/1925 | Sheldon | |
| 1,639,999 A | 8/1927 | Humphreys | |
| 2,006,520 A | 7/1935 | Stone et al. | |
| 2,597,482 A | 5/1952 | Harrison et al. | |
| 2,766,998 A | 10/1956 | Watts et al. | |
| 3,427,047 A | 2/1969 | Mayo | |
| 3,495,854 A | 2/1970 | Fether | |
| 3,508,771 A | 4/1970 | Duret | |
| 3,600,011 A * | 8/1971 | Alvis | 285/305 |
| 3,606,402 A | 9/1971 | Medney | |
| 3,658,368 A | 4/1972 | Hokanson | |
| 3,759,553 A * | 9/1973 | Carter | 285/305 |
| 3,994,516 A | 11/1976 | Fredd | |
| 4,111,464 A | 9/1978 | Asano et al. | |
| 4,269,436 A * | 5/1981 | Medney | 285/305 |
| RE30,647 E | 6/1981 | Blose | |
| 4,289,339 A | 9/1981 | Hansen | |
| 4,293,148 A | 10/1981 | Milberger | |
| 4,297,055 A | 10/1981 | Peacock | |
| 4,398,756 A | 8/1983 | Duret et al. | |
| 4,564,225 A | 1/1986 | Taylor | |
| 4,600,224 A | 7/1986 | Blose | |
| 4,600,225 A | 7/1986 | Blose | |
| 4,601,491 A | 7/1986 | Bell, Jr. et al. | |
| 4,671,544 A | 6/1987 | Ortloff | |
| 4,679,825 A | 7/1987 | Taylor | |
| 4,697,947 A * | 10/1987 | Bauer et al. | 285/305 |
| 4,703,959 A | 11/1987 | Reeves et al. | |
| 4,707,001 A | 11/1987 | Johnson | |
| 4,735,444 A | 4/1988 | Skipper | |
| 4,779,902 A | 10/1988 | Lee | |
| 4,790,571 A | 12/1988 | Montanari et al. | |
| 4,796,928 A | 1/1989 | Carlin et al. | |
| 4,801,222 A | 1/1989 | Froehlich | |
| 4,808,032 A | 2/1989 | John | |
| 4,813,717 A | 3/1989 | Watts | |
| 4,822,081 A | 4/1989 | Blose | |
| 4,838,068 A | 6/1989 | Carlin et al. | |
| 4,925,344 A | 5/1990 | Peres | |
| 4,958,959 A | 9/1990 | St. Onge | |
| 5,013,188 A | 5/1991 | Campbell et al. | |
| 5,018,771 A | 5/1991 | Watts | |
| 5,083,820 A * | 1/1992 | Hopperdietzel | 285/305 |
| 5,104,263 A | 4/1992 | Shibahara et al. | |
| 5,143,411 A | 9/1992 | Watts | |
| 5,226,682 A | 7/1993 | Marrison et al. | |
| 5,255,945 A * | 10/1993 | Toon | 285/305 |
| 5,286,135 A * | 2/1994 | James | 403/319 |
| 5,360,240 A | 11/1994 | Mott | |
| 5,383,692 A | 1/1995 | Watts | |
| 5,407,514 A | 4/1995 | Butts et al. | |
| 5,427,418 A | 6/1995 | Watts | |
| 5,454,605 A | 10/1995 | Mott | |
| 5,513,882 A | 5/1996 | Lewis | |
| 5,516,158 A | 5/1996 | Watts | |
| 5,813,705 A * | 9/1998 | Dole | 285/305 |
| 5,820,720 A | 10/1998 | Campbell | |
| 5,826,921 A | 10/1998 | Woolley | |
| 5,836,621 A | 11/1998 | Campbell | |
| 5,853,204 A | 12/1998 | Bartholomew | |
| 5,855,242 A | 1/1999 | Johnson | |
| 5,868,443 A | 2/1999 | Ungerman | |
| 5,921,591 A | 7/1999 | Argent | |
| 6,039,505 A | 3/2000 | Tenbusch, II | |
| 6,131,954 A | 10/2000 | Campbell | |
| 6,176,523 B1 | 1/2001 | Winslett | |
| 6,325,424 B1 * | 12/2001 | Metcalfe et al. | 285/305 |
| 6,343,813 B1 | 2/2002 | Olson | |
| 6,347,814 B1 | 2/2002 | Cerruti | |
| 6,352,288 B1 | 3/2002 | Calkins | |
| 6,409,175 B1 | 6/2002 | Evans et al. | |
| 6,521,072 B1 | 2/2003 | Campbell | |
| 6,533,327 B1 | 3/2003 | Twardawski et al. | |
| 6,578,880 B2 | 6/2003 | Watts | |
| 6,682,101 B2 | 1/2004 | Watts | |
| 6,688,396 B2 | 2/2004 | Floerke et al. | |
| 6,739,630 B2 * | 5/2004 | Riedy | 285/305 |
| 6,767,035 B2 | 7/2004 | Hashem | |
| 6,851,727 B2 | 2/2005 | Carcagno et al. | |
| 6,913,293 B1 * | 7/2005 | Filer | 285/305 |
| 6,921,114 B1 * | 7/2005 | Washburn et al. | 285/305 |
| 7,066,499 B2 | 6/2006 | Della Pina et al. | |
| 7,097,211 B2 * | 8/2006 | Adams | 285/305 |
| 7,108,295 B1 * | 9/2006 | Zarynow | 285/305 |
| 7,481,464 B2 * | 1/2009 | Fusser | 285/305 |
| 7,588,269 B2 | 9/2009 | Church | |
| 7,690,697 B2 | 4/2010 | Church | |
| 7,887,103 B2 | 2/2011 | Evans et al. | |
| 7,895,726 B2 | 3/2011 | Maguire | |
| 9,200,732 B2 | 12/2015 | Coogan | |
| 2001/0048223 A1 | 12/2001 | Campbell | |
| 2002/0074799 A1 | 6/2002 | Watts | |
| 2002/0112852 A1 | 8/2002 | Floerke et al. | |
| 2002/0117856 A1 | 8/2002 | Watts | |
| 2003/0025327 A1 | 2/2003 | Mannella | |
| 2003/0168859 A1 | 9/2003 | Watts | |
| 2003/0230896 A1 | 12/2003 | Riedy | |
| 2003/0234536 A1 | 12/2003 | Riedy | |
| 2004/0017079 A1 | 1/2004 | Carcagno et al. | |
| 2004/0021314 A1 | 2/2004 | Pina et al. | |
| 2004/0140669 A1 | 7/2004 | Powers et al. | |
| 2005/0093250 A1 | 5/2005 | Santi et al. | |
| 2005/0111919 A1 | 5/2005 | Wentworth | |
| 2007/0110927 A1 | 5/2007 | Head et al. | |
| 2009/0133772 A1 | 5/2009 | Cachon | |
| 2010/0007136 A1 | 1/2010 | Subbaraman | |
| 2011/0101684 A1 | 5/2011 | Leng | |
| 2011/0140417 A1 | 6/2011 | Kluss et al. | |
| 2012/0049513 A1 | 3/2012 | Herrera | |
| 2013/0241191 A1 | 9/2013 | Sackewitz | |
| 2014/0182732 A1 | 7/2014 | Coogan et al. | |
| 2014/0186121 A1 | 7/2014 | Coogan et al. | |

FOREIGN PATENT DOCUMENTS

| | | | |
|---|---|---|---|
| EP | 1301738 B1 | 9/2004 | |
| EP | 1704299 B1 | 7/2007 | |
| EP | 1967690 A2 | 9/2008 | |
| EP | 2157352 A1 * | 2/2010 | F16L 37/14 |
| WO | 9835132 A1 | 8/1998 | |
| WO | 9940355 A1 | 8/1999 | |
| WO | 0206715 A1 | 1/2002 | |
| WO | 0238910 A2 | 5/2002 | |
| WO | 03076837 A1 | 9/2003 | |
| WO | 03093716 A1 | 11/2003 | |
| WO | 2005045188 A1 | 5/2005 | |
| WO | 2005061852 A1 | 7/2005 | |
| WO | 2011056429 A1 | 5/2011 | |

OTHER PUBLICATIONS

International Application No. PCT/US13/57504, filed Aug. 30, 2013, Inventors: John M. Coogan et al.
U.S. Appl. No. 14/015,224, filed Aug. 30, 2013, Inventors: John M. Coogan et al.
U.S. Appl. No. 14/015,231, filed Aug. 30, 2013, Inventors: John M. Coogan et al.
U.S. Appl. No. 14/841,917, filed Sep. 1, 2015, Inventors: John M. Coogan et al.

* cited by examiner

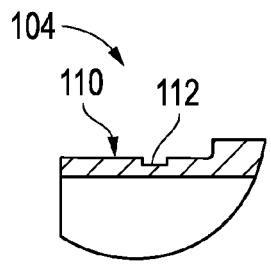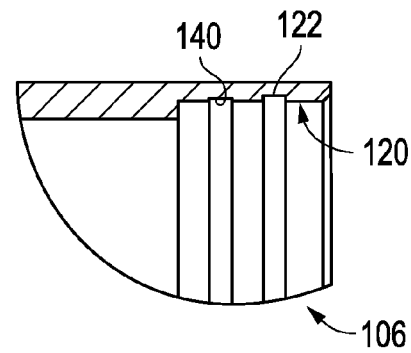
FIG. 2   FIG. 3
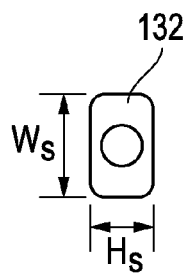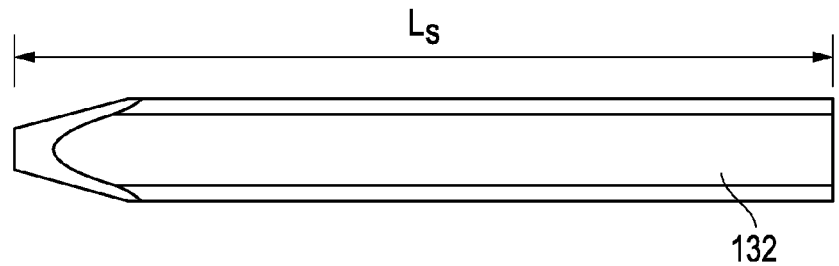
FIG. 4A   FIG. 4B
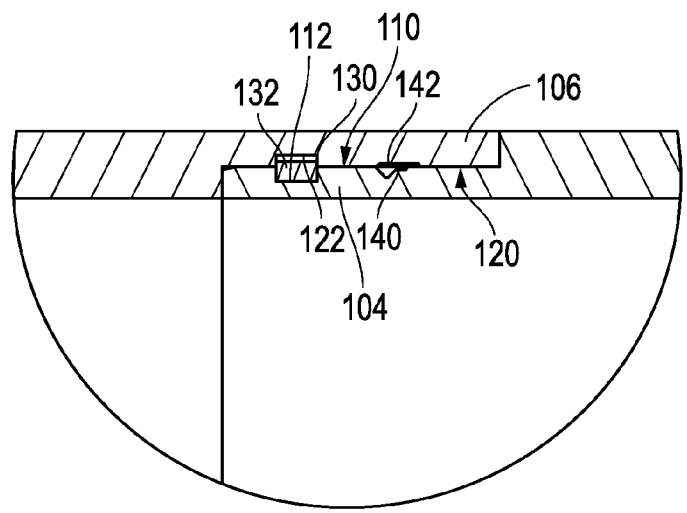
FIG. 5

FLUSH JOINT PIPE

The present application is a continuation of and claims priority under 35 U.S.C. §119(e) to U.S. patent application Ser. No. 14/015,224 filed Aug. 30, 2013, entitled "Flush Joint Pipe" by inventors John M. Coogan et al., which claims priority under 35 U.S.C. §119(e) to U.S. Provisional Application No. 61/748,021, filed Dec. 31, 2012, entitled "Flush Joing Sewer Pipe" by inventors John M. Coogan et al., and is incorporated herein by reference in its entirety.

BACKGROUND

Field of the Disclosure

The present disclosure is directed generally to pipes and more particularly to polymeric pipes and their installation.

Description of the Related Art

In recent years, the use of micro-boring or micro-tunneling has become more prevalent for installing underground pipes. The tunneling or boring machines can allow pipes to be installed under highways or freeways without having to break the road surface and disrupt traffic. Moreover, these machines can be used to install pipes under rivers and other small bodies of water.

The types of pipe that can be installed using these methods vary, but include water pipe and sewer pipes. As the industry is evolving, the types of pipes that can be installed using these methods also is changing. Other applications include pipes for municipal infrastructure improvements, residential utility delivery, water transfer, irrigation pipe and fluid transfer for mining operations, and even electrical conduit and temporary bypass systems.

Accordingly, the industry continues to need improvements in pipes, particularly improvements to pipes that can be installed using a micro-tunneling or micro-boring machine.

SUMMARY

Embodiments of a flush joint pipe and method of installation are disclosed. For example, a method of installing pipe in a subterranean location may include forming a bore in the subterranean location. The bore can include an inner wall at least partially comprising subterranean material. The method may further include moving a first polymeric pipe segment into the bore; coupling a second polymeric pipe segment to the first polymeric pipe segment using a mechanical restraint. The coupled first and second polymeric pipe segments can have a cross-sectional shape that is essentially uniform along the length of the first and second polymeric pipe segments. The method may include moving the first and second polymeric pipe segments into the subterranean location. The first and second polymeric pipe segments can be at least partially in direct contact with the inner wall of the bore.

BRIEF DESCRIPTION OF THE DRAWINGS

The present disclosure can be better understood, and its numerous features and advantages made apparent to those skilled in the art by referencing the accompanying drawings.

FIG. 2 includes an enlarged sectional side view of an embodiment of the pipe at Circle 2 in FIG. 1.

FIG. 3 includes an enlarged sectional view of an embodiment of the pipe at Circle 3 in FIG. 1.

FIGS. 4A and 4B include end and plan views, respectively, of an embodiment of a spline.

FIG. 5 includes a sectional side view of an embodiment of a portion of a pipe joint.

The use of the same reference symbols in different drawings indicates similar or identical items.

DETAILED DESCRIPTION

Figure 1:
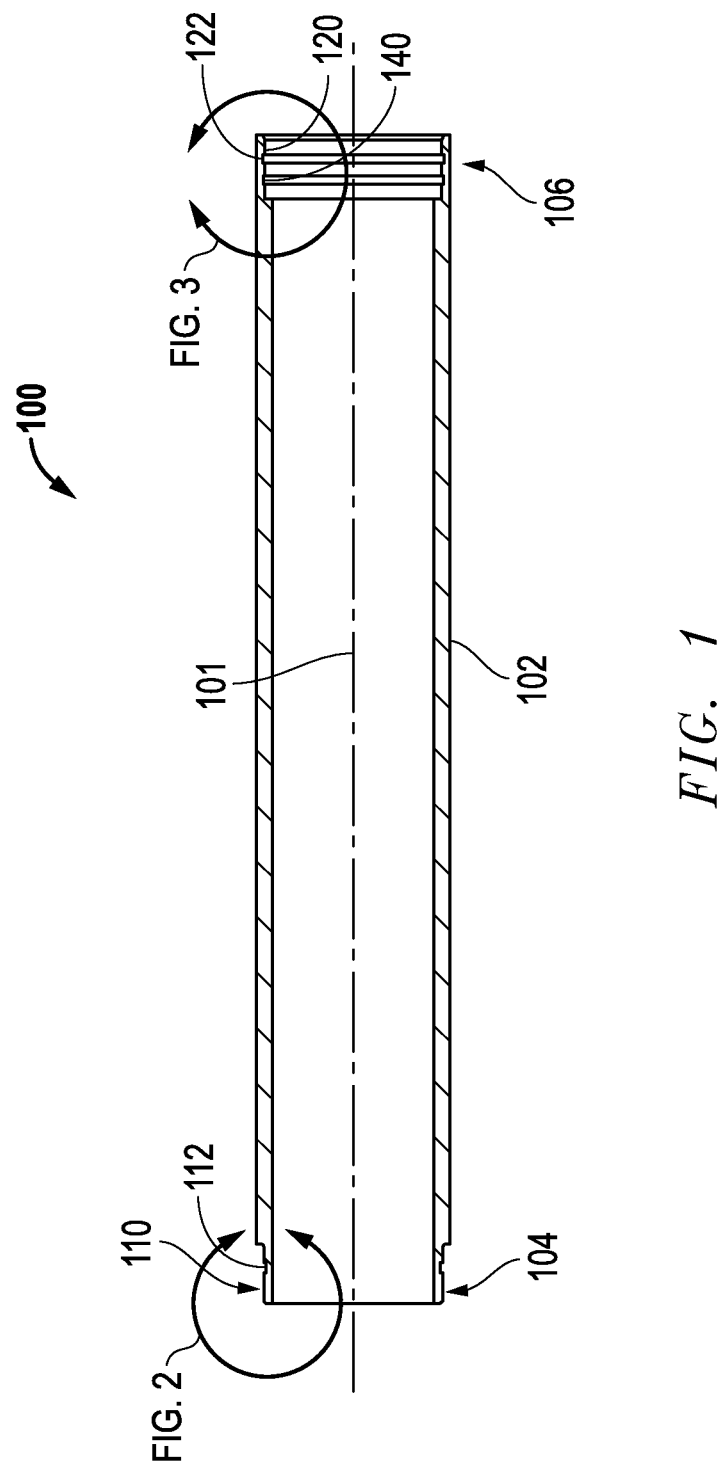
FIG. 1 includes a sectional side view of an embodiment of a pipe.
Figure 6:
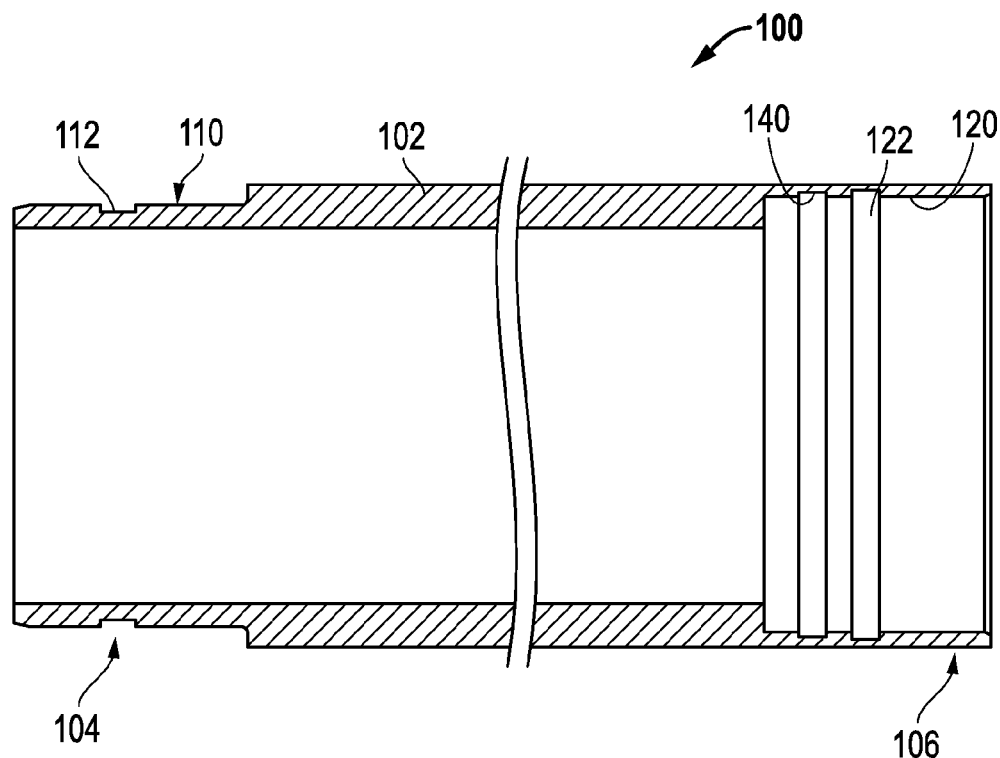
FIG. 6 includes a sectional side view of an embodiment of a pipe.

The following description is directed to pipes, and particularly, to pipes that are configured to have flush joints that minimize resistance when being installed using a micro-boring or micro-tunneling operation.

A typical underground pipe includes a relatively large bell end that can snag and catch on dirt when being installed in such a manner. A string of pipes including the pipe disclosed herein can have a cross-sectional shape that is substantially uniform along the entire length of the string of pipes. Further, the string of pipes is free of protuberances extending beyond an outer wall of the pipe.

Referring to the drawings, a pipe is illustrated and is generally designated 100. Embodiments of the pipe 100 include a flush joint pipe 100 with an axis 101, and a generally a tubular body 102 having a male end 104 and a female end 106. Both the male end 104 and the female end 106 can have cylindrical butt ends. In one version, no chamfers or tapers on the male end 104 or female end 106 are required. The male end 104 can include an external surface 110 that can be formed with a first engagement groove 112. The first engagement groove 112 can be the only groove formed in the male end 104, such that two or more grooves are not required. The female end 106 can include an internal surface 120 that can be formed with a second engagement groove 122.

Figure 7:
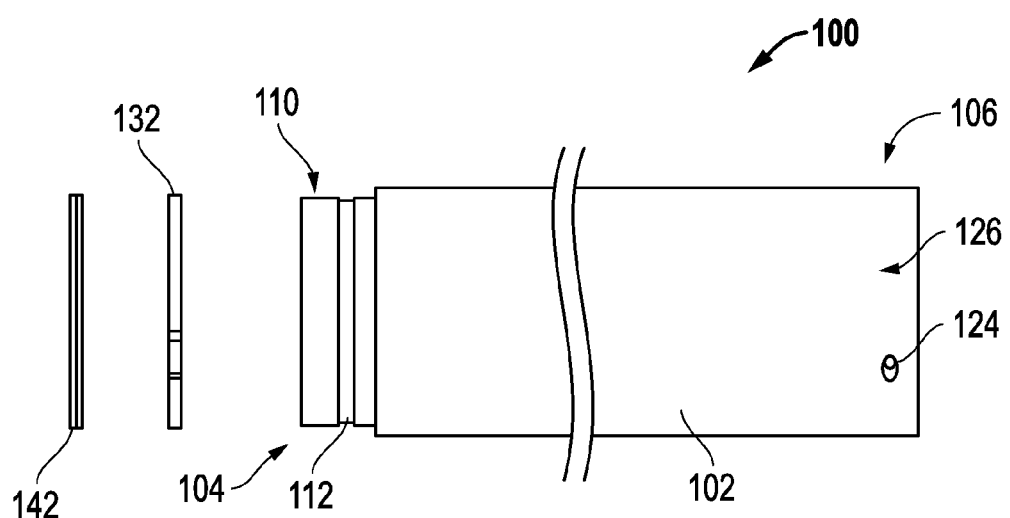
FIG. 7 includes an exploded side view of an embodiment of a pipe assembly.
Figure 8:
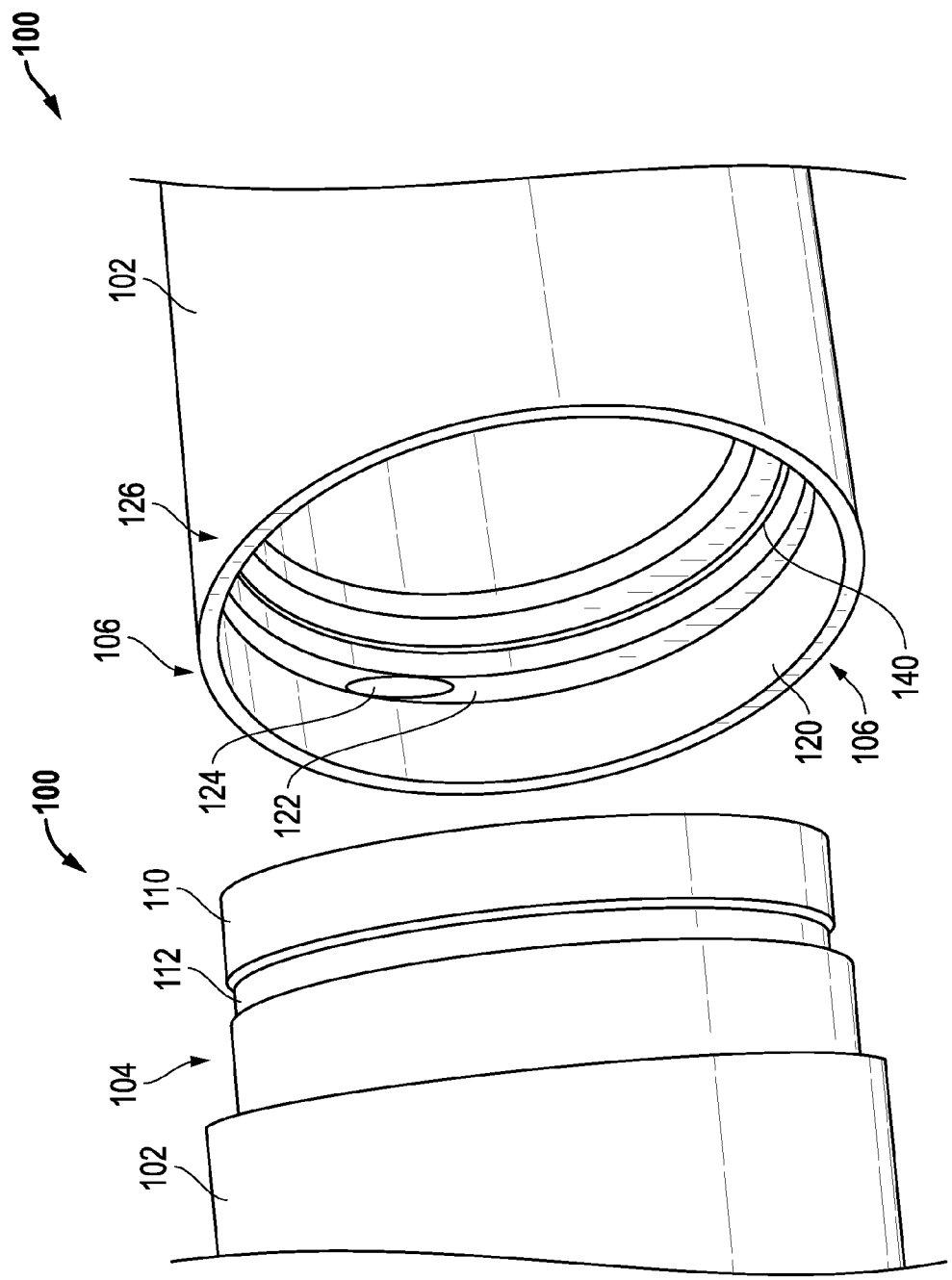
FIG. 8 includes an isometric view of an embodiment of pipe segments prior to forming a joint.

As illustrated in FIGS. 7 and 8, an aperture 124 can extend from an outer surface 126 of the tubular body 102 radially inward to the second engagement groove 122. Embodiments of the aperture 124 can be formed tangential to the first and second engagement grooves 112, 122. Such a tangential direction can reduce resistance to the entry of a flexible spline 132, as described elsewhere herein. The aperture 124 can be round (e.g., drilled), rectangular/square (e.g., milled), etc., and may be oriented for clock-wise or counter-clock-wise spline installation. In addition, the aperture 124 may be formed as small as possible while still enabling a spline to pass therethrough. More than one aperture 124 may be provided, which can allow for the spline to be inserted at different angles and/or directions depending on how the pipe is laying during installation. Such a configuration can also allow a tool to be inserted to assist in the removal of an installed spline.

In a particular aspect, the female end 106 can be configured to receive a male end 104 of another pipe 100 such that a first engagement groove 112 of the male end 104 of the other pipe 100 aligns with the second engagement groove 122 of the female end 106 to collectively establish a spline engagement groove 130, as indicated in FIG. 5. In a particular aspect, the spline engagement groove 130 can have a groove length (i.e., circumferential length relative to the axis), $L_G$ (FIG. 10), measured around the external surface 110 of the male end 104 of the pipe 100.

In addition, the pipe joint assembly may be configured to include an interference between the male end 104 and a seal 142 inside the female end 106. The male and female ends 104, 106 may be close-fitting, but are not necessarily overlapping. A compressive force may be required to assemble the male and female ends 104, 106, due to compression of the seal 142.

In other embodiments, a desired interference fit between the butt ends of two pipes 100 is provided. In a version, there is no axial gap between the butt ends and the shoulders they abut on the respective pipes. For example, inserting one pipe into another may require a selected compressive force to be exerted on the pipes to align the respective first and second engagement grooves 112, 122.

A spline 132, illustrated in FIGS. 4 and 5, can be provided. The spline 132 can be flexible and configured to be inserted and fit through the aperture 124 and entirely into the spline engagement groove 130. The spline 132 can prevent the male end 104 of the other pipe 100 from withdrawing from the female end 106 to establish a pipe joint assembly of two pipes 100. The spline 132 may be formed from different types of materials, such as a polymer (e.g., nylon), glass-reinforced plastics, etc. The material may be chosen to meet the structural, strength and chemical resistance requirements for the intended application. The spline 132 may be extruded, molded, etc.

Figure 10:
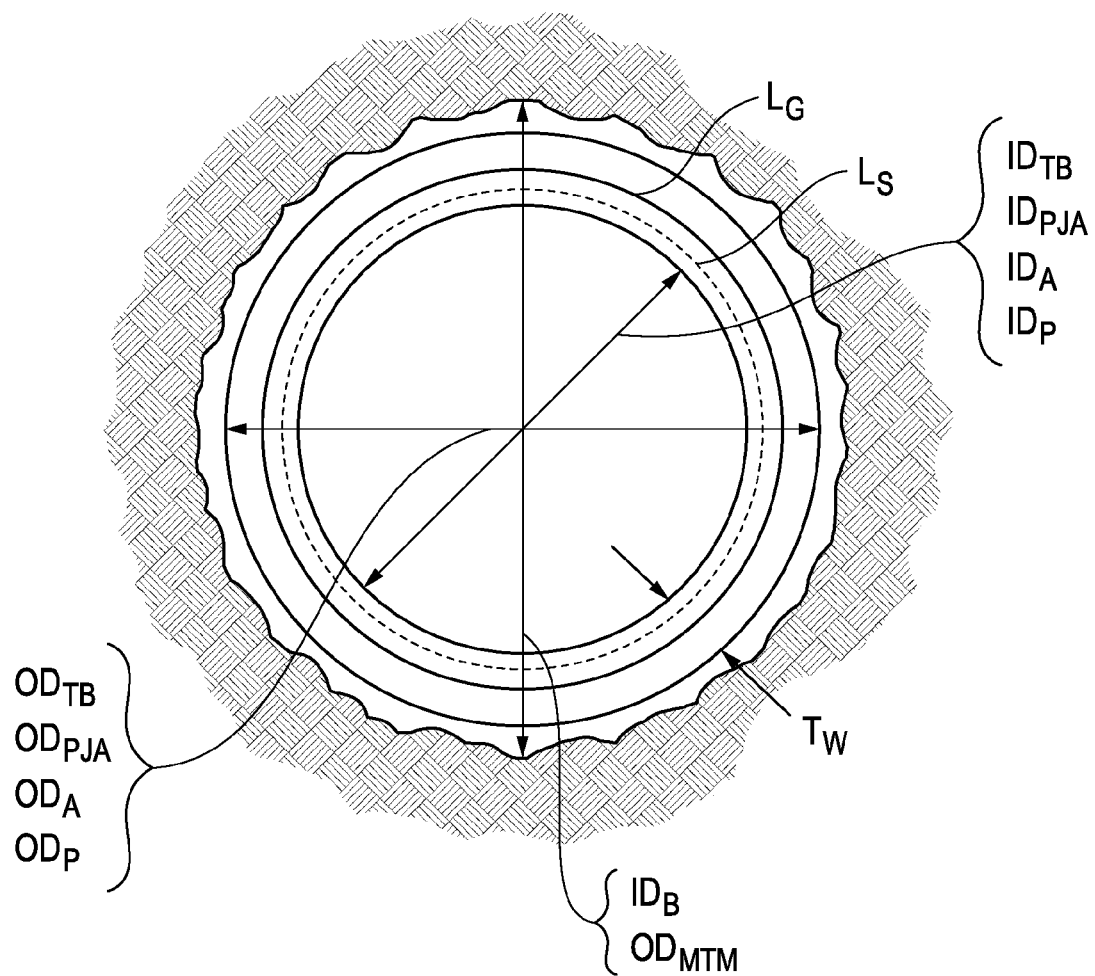
FIG. 10 is an axial end view of an embodiment of a pipe in an earthen formation.

In a particular aspect, the flexible spline 132 can include a spline length, $L_S$ (FIGS. 4 and 10). $L_S$ can be slightly shorter than $L_G$. For example, $L_S$ can be $\leq 95\%$ $L_G$, such as $\leq 90\%$ $L_G$, $\leq 85\%$ $L_G$, or even $\leq 80\%$ $L_G$. In still other embodiments, $L_S$ can be greater than about half the length of $L_G$. For example, $L_S$ can be $\geq 50\%$ $L_G$, such as $\geq 55\%$ $L_G$, $\geq 60\%$ $L_G$, $\geq 65\%$ $L_G$, $\geq 70\%$ $L_G$, or even $\geq 75\%$ $L_G$. In another aspect, $L_S$ can be within a range between and including any of the values described herein.

While a continuous spline 132 is illustrated, a multi-piece spline can be used. Further, multiple splines installed in different grooves may be used, depending on the application. The splines may be configured in a parallel orientation.

Figure 9A:
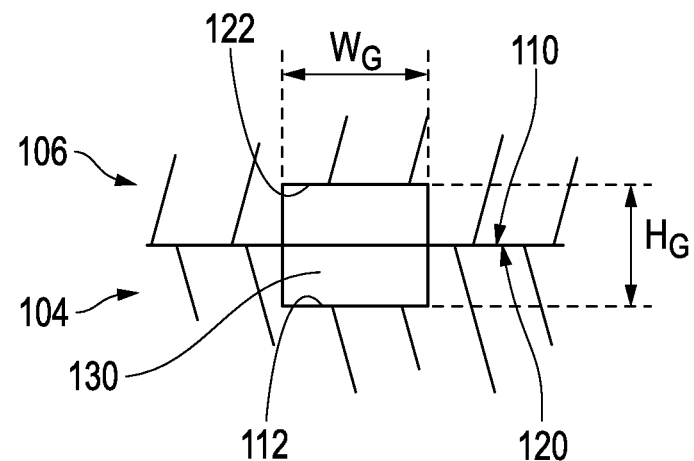
FIGS. 9A and 9B are enlarged sectional side views of an embodiment of a spline groove shown without and with a spline, respectively.
Figure 9B:
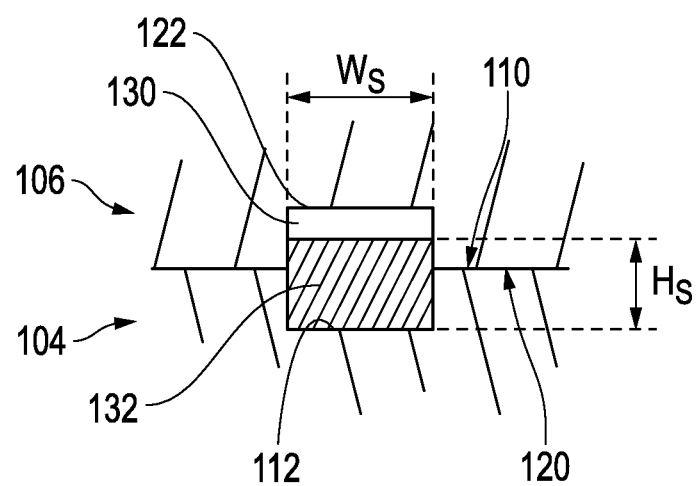

In a particular aspect, the spline engagement groove 130 can have a cross-sectional groove height (i.e., radial length relative to the axis 101), $H_G$ (FIG. 9A). The spline 132 can include a cross-sectional spline height, $H_S$ (FIGS. 4A and 9B). The spline height $H_S$ can be greater than the groove height $H_G$. For example, $H_S$ can be $\geq 50\%$ $H_G$, such as $\geq 55\%$ $H_G$, $\geq 60\%$ $H_G$, $\geq 65\%$ $H_G$, $\geq 70\%$ $H_G$, or even $\geq 75\%$ $H_G$. Further, the spline height $H_S$ can be very similar to the groove height $H_G$. For example, $H_S$ can be $\leq 100\%$ $H_G$, such as $\leq 99\%$ $H_G$, $\leq 98\%$ $H_G$, $\leq 97\%$ $H_G$, $\leq 96\%$ $H_G$, or even $\leq 95\%$ $H_G$. In another aspect, $H_S$ can be within a range between and including any of the values described herein.

In another aspect, the spline engagement groove 130 may include a cross-sectional groove width (i.e., axial length relative to the axis 101), $W_G$ (FIG. 9A). The spline can include a cross-sectional spline width, $W_S$ (FIGS. 4A and 9B). The spline width $W_S$ can be smaller than the groove width $W_G$. For example, $W_S$ can be $\geq 80\%$ $W_G$, such as $\geq 85\%$ $W_G$, $\geq 90\%$ $W_G$, $\geq 95\%$ $W_G$, $\geq 96\%$ $W_G$, $\geq 97\%$ $W_G$, $\geq 98\%$ $W_G$, or even $\geq 99\%$ $W_G$. Further, the spline width $W_S$ can be almost identical to the groove width $W_G$. For example, $W_S$ can be $\leq 100\%$ $W_G$, such as $\leq 99.9\%$ $H_G$, $\leq 98.8\%$ $H_G$, $\leq 99.7\%$ $H_G$, $\leq 99.6\%$ $H_G$, or even $\leq 99.5\%$ $H_G$. $W_S$ can be within a range between and including any of the values described herein.

In a particular aspect, the tubular body 102 can include one or more polymers. For example, the tubular body 102 can include polyolefin. Further, the tubular body 102 can include polyethylene. Alternately, the tubular body 102 can include polyvinyl chloride (PVC). In other aspects, the tubular body 102 can include a composite material, such as fiberglass, carbon fiber, or other fiber reinforced plastic materials, or even a combination of the materials described herein. In one embodiment, the tubular body 102 may not include one or more of these materials. For example, the tubular body 102 may not comprise a polymer.

In another aspect, the pipe joint assembly established by the male 104 and female end 106 can have a tensile strength, TS. The TS can be $\geq 500$ lbs/in$^2$ of cross-sectional area, $A_{CS}$, of the tubular body 102. Tensile strength may be measured by assembling a male/female joint of pipes together, clamping it in a tensile test machine (e.g., UTM), and pulling on the joint until it fails. Tensile strength also may be validated by performing a water pressure burst test through a joint of pipes. In this method, a joint of pipes may be assembled and capped on both ends. The sealed joint is filled with water and the internal pressure is increased until the system fails. The tensile loads applied to the joint may be calculated by multiplying the water pressure and the outside area of the pipe and caps.

Further, the tensile strength TS can be $\geq 750$ lbs/in$^2$, such as $\geq 1000$ lbs/in$^2$. In another aspect, TS can be $\leq 10,000$ lbs/in$^2$, such as $\leq 2250$ lbs/in$^2$, $\leq 2000$ lbs/in$^2$, $\leq 1750$ lbs/in$^2$, or even $\leq 1500$ lbs/in$^2$. Further, TS can be within a range between and including any of the values described herein. Moreover, the assembled pipes can have an outer cross-sectional shape that is substantially uniform along the entire length of the pipe assembly.

In another aspect, the pipe joint assembly can include a compressive strength, CS. The CS may be measure like the TS, but in a reverse direction. For example, the CS can be $\geq 2500$ lbs/in$^2$ of cross-sectional area, A, of the tubular body 102. In other examples, CS can be $\geq 3000$ lbs/in$^2$, or even $\geq 4000$ lbs/in$^2$. Moreover, CS can be $\leq 35,000$ lbs/in$^2$, such as $\leq 25,000$ lbs/in$^2$, $\leq 20,000$ lbs/in$^2$, $\leq 15,000$ lbs/in$^2$, or even $\leq 10,000$ lbs/in$^2$. CS can also be within a range between and including any of the values described herein.

The pipe joint assembly can include a leak pressure, $P_L$. The $P_L$ may include at least one or vacuum testing and pressure testing. The $P_L$ may be tested by forming a pipe joint of at least two pipes, capping the ends, filling the joint with a fluid, and then vacuum and/or pressure testing the system. In one example, the leak pressure $P_L$ can be $\geq -10$ lbs/in$^2$ of surface area, $A_S$, of an inner wall of the tubular body. In other examples, $P_L$ can be $\geq -5$ lbs/in$^2$, $\geq -3$ lbs/in$^2$, or even $\geq -1$ lbs/in$^2$. Further, $P_L$ can be $\leq 1000$ lbs/in$^2$, such as $\leq 955$ lbs/in$^2$, $\leq 755$ lbs/in$^2$, or even $\leq 100$ lbs/in$^2$. $P_L$ can also be within a range between and including any of the values described herein.

As indicated in FIG. 3, the pipe 100 can also include a seal groove or sealing member groove 140 that can be formed in the internal wall 120 of the female end 106 of the tubular body 102. Moreover, a seal or sealing member 142 (FIGS. 5 and 7) can be disposed within the sealing member groove 140. The seal 142 may be formed from a variety of materials, such as elastomers, rubber, etc. In one version, the seal 142 may have a selected hardness. For example, the seal hardness can be in a range of about 35 Shore A to about 115 Shore A. The seal 142 can compress and/or deform against the smooth exterior surface of the outer surface 110 of the male end 104. There can be a clearance between outer surface 110 and inner surface 120 in a joint of pipes. The seal 142 can deform into the clearance to fill it. Thus, in an embodiment, there is no expansion or deformation of female end 106 when male end 104 is joined thereto.

In a particular aspect, the sealing member 142 is configured to deform as the male end 104 of one pipe 100 is inserted within the female end 106 of another pipe 100. Specifically, the sealing member 142 can be configured to engage the external wall 110 of the male end 104 of the tubular body 102 and form a sealed joint between the female end 106 and the male end 104 of the respective pipes 100.

In some versions, the sealing member 142 can include an elastic material. Moreover, the sealing member 142 can include rubber. In a particular aspect, the sealing member 142 can include a composite structure that includes a support structure and a sealing member.

In a particular aspect, the tubular body 102 can include an outer diameter, $OD_{TB}$ (FIG. 10). The pipe joint assembly can include an outer diameter, $OD_{PJA}$. In one version, $OD_{PJA}=OD_{TB}$, or they can be substantially equal. Further, the tubular body can include a wall thickness, $T_W$. A ratio of $T_W:OD_{TB}$ can be <1:20, such as ≤1:19, ≤1:18, ≤1:17, ≤1:16, or even ≤1:15. Further, $T_W:OD_{TB}$ can be ≥1:10, or ≥1:11, or ≥1:12.

In yet another aspect, the pipe joint assembly can include a flexural strength, FS. The FS can be measured at the pipe joint assembly using a three point flexural test. Flexural testing may be performed by assembling a pipe joint, capping the ends of the system, filling it with water at a nominal pressure, and then bending the system in a three-point press until leakage is noted at the joint. FS can be ≥2500 psi, such as ≥3500 psi, ≥5000 psi, or even ≥7500 psi. Further, FS can be ≤50,000 psi, such as ≤35,000 psi, ≤25,000 psi, or even ≤15,000 psi. The FS can be in a range between any of these values.

The flush pipe joint can include average outside diameter, $OD_A$ (FIG. 10). The $OD_A$ can be a relatively small diameter. In addition, the $OD_A$ can have a tight tolerance. For example, $OD_A$ can be ≥2.375"±0.011", such as $OD_A$≥6.275"±0.011", ≥8.400"±0.012", ≥9.440"±0.014", ≥10.500"±0.015", ≥12.500"±0.018", or even ≥15.300"±0.023". In other examples, $OD_A$ can be a relatively larger diameter, such as ≤36.300"±0.054", ≤30.300"±0.045", or even ≤24.300"±0.036". In other embodiments, the ODA can be ±0.100". The $OD_A$ can be within a range between and including any of the values described herein.

Other embodiments of the flush pipe joint can include an $OD_A$ (FIG. 10), that is very consistent. For example, $OD_A$ can be about ±0.5%. In another version, the $OD_A$ can be about ±0.4%, such as about ±0.3%, about ±0.2%, about ±0.19%, about ±0.18%, about ±0.17%, about ±0.16%, about ±0.15%, or even about ±0.14%. The $OD_A$ can be within a range between and including any of the values described herein.

Similarly, the flush pipe joint can include an average inside diameter, $ID_A$, that is also very consistent. For example, $ID_A$ can be about ±0.5%. In another version, the $ID_A$ can be about ±0.4%, such as about ±0.3%, about ±0.2%, about ±0.19%, about ±0.18%, about ±0.17%, about ±0.16%, about ±0.15%, or even about ±0.14%. The $ID_A$ can be within a range between and including any of these values described herein.

Accordingly, the pipe joint assembly comprises two or more pipes that can have a very consistent outer diameter, a very consistent inner diameter, or both. Thus, the pipe joint assembly has an unusually high level of concentricity between the pipes (e.g., at the ID, the OD and/or at the interfaces therebetween) that make up the joint. For example, the pipe can include a concentricity relative to a pipe axis, wherein the concentricity at an outside diameter, an inside diameter and an interface between pipe segments is about ±0.5%. Such consistency in all pipes in the pipe joint assembly enables easier installation of a pipeline, as well as ease of fluid flow through the interior of the pipeline in operation.

In a particular aspect, the tubular body 102 can include an inner diameter, $ID_{TB}$. The pipe joint assembly can include an inner diameter, $ID_{PJA}$. In one version, $ID_{PJA}=ID_{TB}$. Further, the tubular body 102 can include a wall thickness, $T_W$. A ratio of $T_W:ID_{TB}$ can be <1:20, such as ≤1:19, ≤1:18, ≤1:17, ≤1:16, or even ≤1:15. Further, $T_W:ID_{TB}$ can be ≥1:10, or ≥1:11, or ≥1:12. The ratio also can be in a range between any of these values.

Embodiments of the pipe 100 can have a diameter ratio (DR). Pipe DR (or SDR), as defined by Uni-Bell, help classify various thicknesses of nominally sized pipe. The terms "dimension ratio" and "standard dimension ratio" are widely used in the pipe industry (abbreviated DR and SDR). Both terms refer to the same ratio, which is a dimensionless term that is obtained by dividing the average outside diameter of the pipe by the minimum pipe wall thickness.

$$SDR=DR=OD_A/t$$

where: $OD_A$=average outside diameter
t=minimum wall thickness

DR classifications may be characterized by:
(a) the lower the DR number, the thicker the pipe wall;
(b) the pressure capacity of a particular DR is constant regardless of diameter; and
(c) the structural strength of a particular DR is constant regardless of diameter. In the definition of a pipe's pressure rating, the hydrostatic design stress (S), rather than the hydrostatic design basis, is used in calculations. The design stress is the value obtained when HDB is divided by a desired factor of safety (F).

In a particular embodiment, DR can be >7, >13, or >15. Further, DR can be ≤32, such as ≤26, or even ≤21. DR can be within a range between and including any of the values described herein.

In another aspect, the pipe 100 can include an impact strength, S. The impact strength S can be measured in a number of industry standard ways. For base material, notches, izod or charpy testing is performed. For pipe impact test (from Uni-Bell), pipe samples are placed on a specified holder and are subjected to impact by a metal tip of defined geometry and weight falling from a specified height. Impact resistance by PVC pipe may be reported in foot-pounds (Joules) of energy. Impact resistance testing is conducted in accordance with ASTM D 2444.

In some embodiments, the impact strength S, at 23° C., can be ≥284 J (210 ft·md lbs), such as ≥299 J (220 ft·md lbs). Further, S, at 23° C. can be ≤2000 J (1475 ft·md lbs), such as ≤1750 J (1290 ft·md lbs), ≤1500 J (1106 ft·md lbs), ≤1250 J (921 ft·md lbs), or ≤1000 J (737 ft·md lbs). The impact strength can be in a range between any of these values.

The flush joint pipe 100 can be installed within a bore that is formed by a micro-boring or micro-tunneling machine. As shown in FIG. 10, the pipe 100 can include an outer diameter, $OD_P$, and the bore can include an inner diameter, $ID_B$. The $OD_P$ can be very similar to the $ID_B$. For example, a ratio of $ID_B:OD_P$ can be ≥1, such as ≥1.01, ≥1.02, ≥1.03, ≥1.04, or even ≥1.05. Moreover, $ID_B:OD_P$ can be ≤1.25, such as ≤1.20, ≤1.15, or even ≤1.10.

In another aspect, the micro-tunneling machine can include an outer diameter, $OD_{MTM}$. For ease of illustration, $OD_{MTM}$ is depicted as the inner diameter $ID_B$ of an earthen bore in FIG. 10. However, in practice, $OD_{MTM}$ would be slightly smaller than the inner diameter $ID_B$ of the earthen bore shown. The $OD_{MTM}$ can be very similar to the $OD_P$. For example, the ratio $OD_{MTM}:OD_P$ can be ≥1, such as ≥1.01, ≥1.02, ≥1.03, ≥1.04, or even ≥1.05. In other versions, $O_{MTM}:O_{DP}$ can be ≤1.25, such as ≤1.20, ≤1.15, or even ≤1.10.

In another embodiment, a method of installing a pipe can include a retrofit of existing or previously installed pipeline. For example, the method can include locating and exposing a previously installed pipeline in a bore hole; pulling a cutting head through the previously installed pipeline; breaking the previously installed pipeline with the cutting head and expanding the bore hole to a larger size by pushing pipe fragments of the previously installed pipeline into soil surrounding the bore hole; and then pulling a new pipe having a flush joint into the enlarged bore hole behind the cutting head. The cutting head can be static or dynamic, and can include at least one of hammering and turning cutters, and pneumatic systems.

With the configuration of structure described herein, the flush joint pipe 100 provides a pipe that can be installed using a micro-tunneling machine. The pipe can be pushed or pulled through a bore and can be installed directly in the earth in direct contact with the earth. The pipe can be a smooth walled pipe that is essentially free of protuberances. Further, the pipe is extremely strong in both compression and tension. Moreover, flexural strength of the pipe is relatively high and can allow the pipe to be installed over non-linear pathways.

One or more of the pipes can be installed by within a subterranean location by forming a bore in the subterranean location, e.g., using a micro-tunneling machine or a micro-boring machine. The bore can include an inner wall that at least partially includes subterranean material such as rocks, dirt, etc. A first polymeric pipe segment can be moved into the bore. Then, a second polymeric pipe segment can be coupled to the first polymeric pipe segment using a mechanical restraint, such as the spline described herein. The assembled or coupled first and second pipes can have a cross-sectional shape that is essentially uniform along the length of the first and second pipes. The first and second polymeric pipe segments can be moved into the subterranean location and the first and second polymeric pipes can be in direct contact with the inner wall of the earthen bore.

In another aspect, the method can include coupling the first polymeric pipe segment to a micro-tunneling machine and running, or otherwise operating, a cutting head on the micro-tunneling machine while moving one or more polymeric pipe segments. Coupling the second polymeric pipe segment to the first polymeric pipe segment can include engaging an end of the second polymeric pipe segment with an end of the first polymeric pipe segment such that a spline engagement groove is established between the first pipe and the end of the second pipe and inserting a spline into the spline engagement groove to establish a polymeric pipe joint assembly.

In a particular aspect, the pipes can be deployed directly into the subterranean location without an outer casing around the one or more polymeric pipe segments. Further, the one or more polymeric pipe segments can be pushed into the bore or pulled through the bore.

Those of ordinary skill in the art will recognize that there may be other applications that can utilize a pipe having one or more of the characteristics described herein.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:

1. A pipe assembly, comprising:
   a male end of a first pipe having an axis, wherein the male end comprises an outer diameter surface having a first engagement groove;
   a female end of a second pipe, wherein the female end comprises an inner diameter surface having a seal groove, a second engagement groove and an aperture extending from an outer surface of the second pipe to the second engagement groove, wherein the female end of the second pipe is configured to receive the male end of the first pipe such that the first engagement groove axially aligns with the second engagement groove to establish a spline engagement groove;
   a flexible spline configured to fit through the aperture and into the spline engagement groove and to engage the first engagement groove and the second engagement groove to prevent the male end of the first pipe from withdrawing from the female end of the second pipe;
   a seal compressed radially between the outer diameter surface of the male end of the first pipe and the seal groove of the inner diameter surface of the female end of the second pipe, such that the seal is axially spaced apart from a distal portion of the male end in the pipe assembly;
   the pipe assembly comprises a tensile strength, TS, and 10,000 lbs/in²≥TS≥500 lbs/in² of cross-sectional area, $A_{CS}$, of the first pipe; and
   an interference fit between the first and second pipes, such that there is no axial gap therebetween, and a compressive force is required between the first and second pipes themselves to form the pipe assembly and to align the first and second engagement grooves.

2. The pipe assembly of claim 1, wherein the pipe assembly comprises a tensile strength, TS≥500 lbs/in² of cross-sectional area, $A_{CS}$, of the tubular body; and
   the female end of the second pipe contains a shoulder with no chamfer or taper, and the shoulder is in abutment with a cylindrical butt end of the male end.

3. The pipe assembly of claim 2, wherein TS≤10,000 lbs/in²; and
   the pipes are polymeric.

4. The pipe assembly of claim 1, wherein the pipes are polymeric and comprise a concentricity relative to a pipe axis, wherein the concentricity at an outside diameter and an inside diameter of the pipe assembly, and an interface between the pipes is about ±0.5%;

the spline engagement groove has a length, $L_G$, and the spline has a length, $L_S$, and wherein $L_S<L_G$; and the first engagement groove is the only groove formed in the male end of the first pipe.

5. The pipe assembly of claim 1, wherein the pipes comprise a concentricity relative to the axis, wherein the concentricity at an outside diameter and an inside diameter of the pipe assembly, and an interface between the pipes is about ±0.5%.

6. A pipe assembly, comprising:

a first pipe having an axis and a male end comprising an outer diameter surface having a first engagement groove, and the male end comprises a cylindrical butt end;

a second pipe having a female end comprising an inner diameter surface having a second engagement groove and an aperture extending from an outer surface of the second pipe to the second engagement groove, wherein the female end of the second pipe is configured to receive the male end of the first pipe such that the first engagement groove axially aligns with the second engagement groove to establish a spline engagement groove, such that the pipes themselves have an interference fit therebetween;

a flexible spline configured to fit through the aperture into the spline engagement groove to engage the first engagement groove and the second engagement groove to establish the pipe assembly and to prevent the male end of the first pipe from withdrawing from the female end of the second pipe;

the pipe assembly comprises an outer cross-sectional shape that is substantially uniform along an entire axial length of the pipe assembly;

the spline engagement groove has a length, $L_G$, and the spline has a length, $L_S$, and wherein $L_S<L_G$;

a seal groove formed in the inner diameter surface of the female end of the second pipe, wherein the seal groove is axially spaced apart from a distal portion of the male end in the pipe assembly;

a seal radially compressed between the outer diameter surface of the male end of the first pipe and the seal groove of the inner diameter surface of the female end of the second pipe, such that the seal also is axially spaced apart form the distal portion of the male end in the pipe assembly; and there is no axial gap between the pipes, and a compressive force is required between the pipes themselves to form the pipe assembly and to align the engagement grooves.

7. The pipe assembly of claim 6, wherein the spline engagement groove comprises a cross-sectional groove height, $H_G$, and the spline comprises a cross-sectional spline height, $H_S$, wherein $100\% \ H_G \geq H_S \geq 50\% \ H_G$;

the pipes abut each other to form a flush joint having a tolerance of +/−0.100 inches on an exterior thereof; and the female end of the second pipe contains a shoulder with no chamfer or taper, and the shoulder is in abutment with the cylindrical butt end of the male end.

8. The pipe assembly of claim 6, wherein each pipe comprises at least one of a polymer, polyvinyl chloride (PVC), polyethylene, polyolefin, a composite material, fiberglass, carbon fiber, fiber reinforced plastic material or any combination thereof.

9. The pipe assembly of claim 6, wherein the pipe assembly comprises a compressive strength, $CS \geq 2500$ lbs/in$^2$ of cross-sectional area, $A_{CS}$, of the pipe; and the first engagement groove is the only groove formed in the male end of the first pipe.

10. The pipe assembly of claim 9, wherein $CS \leq 35,000$ lbs/in$^2$.

11. The pipe assembly of claim 6, wherein the pipe assembly comprises a leak pressure, $P_L$, $\geq -10$ lbs/in$^2$ of surface area, $A_S$, of an inner wall of the pipe.

12. The pipe assembly of claim 11, wherein $P_L$, $\leq 1000$ lbs/in$^2$.

13. The pipe assembly of claim 6, wherein each pipe comprises an outer diameter, $OD_{TB}$, and the pipe assembly comprises an outer diameter, $OD_{PJA}$, wherein $OD_{PJA}$ is substantially equal to $OD_{TB}$.

14. The pipe assembly of claim 13, wherein each pipe comprises a wall thickness, $T_W$, wherein a $T_W:OD_{TB}<1:20$.

15. The pipe assembly of claim 14, wherein $T_W:OD_{TB} \geq 1:10$.

16. The pipe assembly of claim 6, wherein the pipe assembly comprises a flexural strength, FS, measured at the pipe assembly using a three point flexural test, and $FS \geq 2500$ psi.

17. The pipe assembly of claim 16, wherein $FS \leq 50,000$ psi.

18. A pipe assembly, comprising:

a pair of polymeric pipes, comprising:

a first pipe having an axis and a male end comprising an outer diameter surface having a first engagement groove;

a second pipe having a female end comprising an inner diameter surface having a seal groove axially spaced apart from a distal portion of the male end in the pipe assembly, the female end also comprising a second engagement groove and an aperture extending from an outer surface of the second pipe to the second engagement groove, wherein the female end of the second pipe is configured to receive the male end of the first pipe such that the first engagement groove axially aligns with the second engagement groove to establish a spline engagement groove;

a flexible spline configured to fit through the aperture into the spline engagement groove to engage the first engagement groove and the second engagement groove to establish the pipe assembly and to prevent the male end of the first pipe from withdrawing from the female end of the second pipe;

the spline engagement groove has a length, $L_G$, and the spline has a length, $L_S$, and wherein $50\% \ L_G \leq L_S \leq 95\% \ L_G$;

a seal compressed radially between the outer diameter surface of the male end of the first pipe and the seal groove of the inner diameter surface of the female end of the second pipe, such that the seal also is axially spaced apart from the distal portion of the male end in the pipe assembly;

the pipe assembly comprises an outer cross-sectional shape that is substantially uniform along an entire axial length of the pipe assembly;

the pipe assembly comprises an inner cross-sectional shape that is substantially uniform along an entire axial length of the pipe assembly; and an interference fit between the first and second pipes themselves, such that there is no axial gap therebetween, and a compressive force is required between the first and second pipes themselves to form the pipe assembly and to align the first and second engagement grooves.

19. The pipe assembly of claim 18, wherein each pipe comprises at least one of a polymer, polyvinyl chloride (PVC), polyethylene, polyolefin, a composite material, fiberglass, carbon fiber, fiber reinforced plastic material or any combination thereof; and the male end of the first pipe comprises a cylindrical butt end.

20. The pipe assembly of claim 19, wherein the pipe assembly comprises a tensile strength, 10,000 lbs/in$^2$≥TS≥500 lbs/in$^2$ of cross-sectional area, $A_{CS}$, of the tubular body; and the female end of the second pipe contains a shoulder with no chamfer or taper, and the shoulder is in abutment with the cylindrical butt end of the male end.

21. The pipe assembly of claim 18, wherein the pipe assembly comprises a compressive strength, 35,000 lbs/in$^2$≥CS≥2500 lbs/in$^2$ of cross-sectional area, $A_{CS}$, of the pipe; and the first engagement groove is the only groove formed in the male end of the first pipe.

22. The pipe assembly of claim 18, wherein the pipe assembly comprises a leak pressure, 1000 lbs/in$^2$≥$P_L$, ≥−10 lbs/in$^2$ of surface area, $A_S$, of an inner wall of the pipe.

23. The pipe assembly of claim 18, wherein each pipe comprises an outer diameter, $OD_{TB}$, and a wall thickness, $T_W$, wherein 1:10<$T_W$:$OD_{TB}$<1:20.

24. The pipe assembly of claim 18, wherein the pipe assembly comprises a flexural strength, FS, measured at the pipe assembly using a three point flexural test, and 50,000 psi≥FS≥2500 psi.

* * * * *